A. F. & C. H. NORRIS.
PEDAL.
APPLICATION FILED MAY 21, 1915.
1,194,311.
Patented Aug. 8, 1916.
2 SHEETS—SHEET 1.
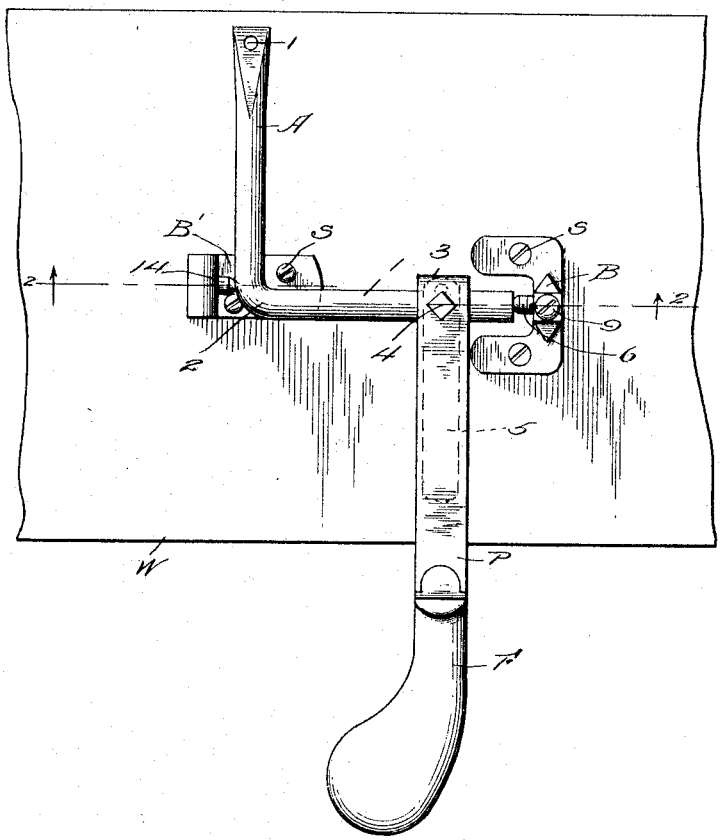
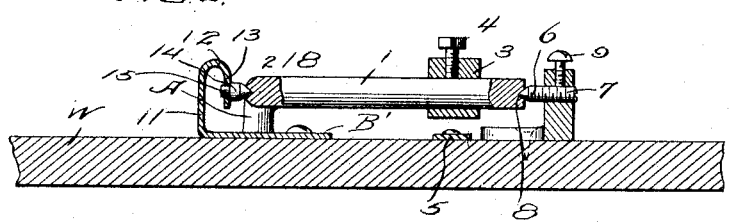
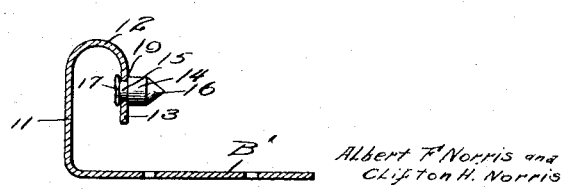
Witnesses
Inventors
Albert F. Norris and
Clifton H. Norris.
By Mason Fenwick Lawrence
Attorneys A. F. & C. H. NORRIS.
PEDAL.
APPLICATION FILED MAY 21, 1915.
1,194,311.
Patented Aug. 8, 1916.
2 SHEETS—SHEET 2.
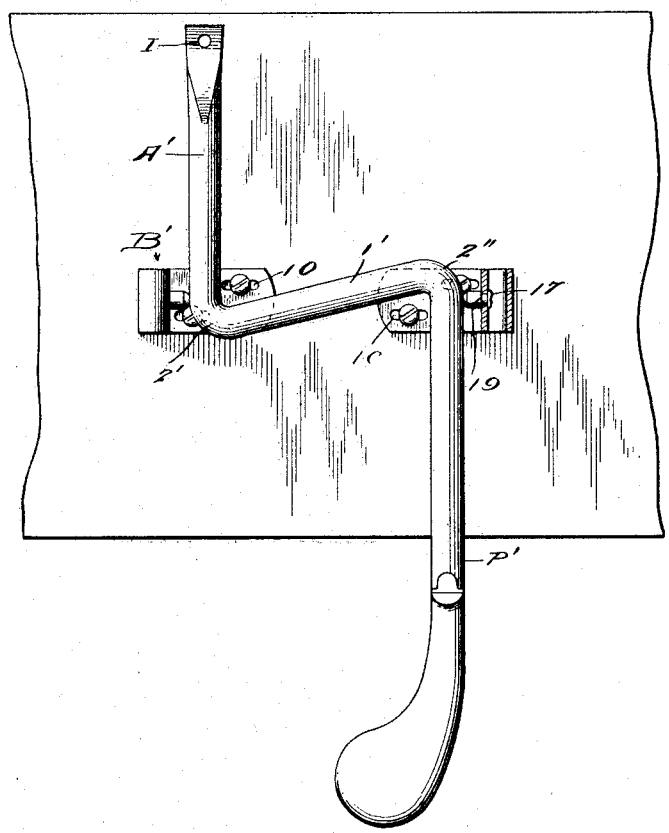
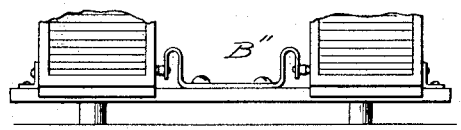
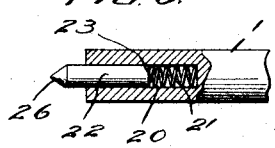
Inventors
Albert F. Norris and Clifton H. Norris
Witnesses

UNITED STATES PATENT OFFICE.

ALBERT F. NORRIS AND CLIFTON H. NORRIS, OF STOUGHTON, MASSACHUSETTS.

PEDAL.

1,194,311.  Specification of Letters Patent.  Patented Aug. 8, 1916.

Application filed May 21, 1915. Serial No. 29,575.

*To all whom it may concern:*

Be it known that we, ALBERT F. NORRIS and CLIFTON H. NORRIS, citizens of the United States, residing at Stoughton, in the county of Norfolk and State of Massachusetts, have invented certain new and useful Improvements in Pedals; and we do hereby declare the following to be a full, clear, and exact description of the invention, such as will enable others skilled in the art to which it appertains to make and use the same.

This invention relates to music and more especially to pedals such as are used on pianos and similar instruments for giving expression or for pumping; and the object of the same is to make the pedal of very few pieces and mount it in an improved manner and in widely spaced bearings so as to prevent its being twisted out of place or dislodged. Special bearings are employed to avoid rattling or other noise and to take up for wear and for variation in the spacing of the parts which is occasioned by changes in the wooden base on which they are usually supported. These objects are carried out in a variety of ways as set forth below, but in whatever manner the end is accomplished we prefer to have one or both bearings adjustable, either in their brackets or by adjusting the brackets themselves, and we prefer also to have one or both of the brackets resilient or yielding and perhaps also adjustable. In other words, the bearings (hereinafter specified as pins) may be mounted in their supports so as to be adjustable manually or yieldingly and automatically, the supports may be brackets which can themselves yield, and these supports or brackets may be mounted on a base in such manner that they are capable of manual adjustment. While we may not use all three of these adjusting means in any one structure, we might do so and we propose always to use two such means in our effort to produce a pedal mechanism which is positively noiseless, wherein most of the rattle is taken up automatically, and wherein looseness occasioned by wear or shrinkage may be taken up manually. Wherever two elements are connected, and especially where the connection is by means of screws, there is an opportunity for looseness and hence rattle to occur; and in order to avoid this possibility as well as to cheapen the cost of manufacture we prefer to form the rocking element of this pedal mechanism of a shaft from one end of which an arm projects integrally to the rear; sometimes we also cause the pedal to project from the other end of the shaft integrally to the front. This element may be produced in any suitable way, even by casting, but if it be made from a rod of metal and the rod bent sharply to produce the arm or both the arm and pedal, that portion of the rod between its angles will constitute a rock shaft and the bearings on which it rocks, while standing practically opposite the ends of such shaft, will in fact have to be carried a little around the angles which cannot of course be too abrupt when a metal rod is bent. Details are explained in this specification and are shown in the drawings wherein:—

Figure 1 is a plan view of one form of our pedal and its support, and Fig. 2 is a section on the line 2—2 of Fig. 1. Fig. 3 is a plan view showing how the pedal and the arm can be made in one piece, and this view also illustrates how both bearings could be resilient and one of them also adjustable. Fig. 4 is a detail showing how a bearing having two yielding points or cones could be made, so that it might be utilized between two pumping pedals whose outside bearings would be adjustable in accordance with this invention. Fig. 5 is an enlarged vertical section through the form of yielding support or bearing illustrated in the prior views, and Figs. 6 and 7 are details of other forms of yielding bearings.

In the drawings we have shown our invention as applied to a pedal P having a foot piece F, wherein the depression of the same elevates an arm A which has an eye I at its rear end by means of which it is attached to the mechanism which is to be actuated by the pedal, as well understood and not necessary to illustrate and describe further.

The present invention lies in making the structure of few parts and in the means for pivotally supporting it on a wooden base W such as is ordinarily found in the lower portion of an upright piano or a player piano. When the pedal is one of the expression pedals, there are two or three of them mounted in bearings on such base; when the pedals are used for pumping purposes, usually two of them are mounted side by side on a pedal base although the latter is ordinarily of wood. In either event the wood is liable to shrink or warp slightly so that the bearings do not remain constantly the same distance from each other, and ordinary bearings and trunnions always wear under use—both of which contingencies often cause a pedal in time to rattle because no provision is made for taking up the looseness of parts. It is one purpose of the present invention to accomplish this automatically if the looseness is trifling, or to permit it to be taken up manually if it should become considerable. Another purpose of the invention is to cheapen the construction of the pedal mechanism and widen its range of use.

Coming now to the details as shown in the drawings, and more especially in Figs. 1 and 2, the numeral 1 designates a rod of about three-quarter inch diameter which constitutes a rack shaft and is bent to the rear in substantially a right angle at the point 2 and continued thence into the arm A above mentioned, near one end and the rear end of the pedal P has an eye 3 mounted on said shaft near its other end as by a set screw 4, this pedal being normally raised by a spring 5 so that the arm is depressed. In order that pressure on the foot piece F will raise the rear end of the arm at I, the shaft must stand above the base. Accordingly we mount it in bearings which are carried by brackets B secured to the base W by any suitable means such as screws S. In Figs. 1 and 2 the right hand bearing is rendered adjustable by the simple expedient of making it in the form of a cone-pointed screw 6 which is adjustable through the upright arm of the bracket B by applying a screw driver to its nick 7, its conical point entering a socket 8 in the end of the rod 1, and if desired a set screw 9 may be threaded into the upper end of the bracket so that its tip will bear upon the cone screw 6 to prevent the latter from unscrewing after it has been set up. We do not wish to be limited to the exact means of adjustment, but we would have one bearing for this pedal mechanism adjustable in any event, although it is quite possible that both bearings could be rendered adjustable as will appear below. Besides being adjustable manually, the bearing should yield, and perhaps the simplest way in which this can be effected is by using a yielding or resilient support in Figs. 1 to 5 inclusive where the bracket B' is made of strap metal of such thickness as will permit it to yield slightly under pressure. Its lower portion lies upon the base W to which it is secured by screws S, and these screws may pass through slots 10 as shown in Fig. 3 so as to render the entire bracket adjustable. In fact this detail may be applied to both brackets. Its upright portion 11 stands at perhaps a right angle to its lower portion, and is curved over at its upper end as at 12 into a depending tongue 13 which preferably stands about parallel with the portion 11 and may pass about half way down to the lower portion, and into this tongue is inserted the bearing or pin 14 which by preference has a conical point 16 entering a socket 18 in the pedal structure at this side, while the pin is held in the tongue in any suitable way as by having a reduced extension 15 passing through the tongue and possibly riveted or upset as shown at 17. However, it is not necessary that this point or pin 14 be secured within the tongue, because the pressure of parts will hold it in place with its shoulder 19 bearing against the tongue, as will be clear. With the lower portion of the bracket resting flat on the base W as seen in Fig. 5, beneath the rock shaft 1 and out of the way, the other parts rise from said base and are in a manner compensating as will be seen. That is to say, if such base be of wood and the brackets are quite a distance apart, the wood may swell or shrink under variation in temperature and humidity, and the bearings carried by said brackets would therefore be separated or brought toward each other slightly and adjusted without even the knowledge of the user. Assuming that the wooden base shrunk under heat and the two brackets approached each other, the tongue 13 could spring outward a little, moving in an arc around the point 12; and the upright 11 could also swing outward a little moving in an arc around its angle with the foot piece. The result would be that the pin in Fig. 5 would move straight outward along its axis rather than being deflected ever so little by the altered position of the parts of the bracket.

The bracket lettered B' in Fig. 5 may be duplicated as at B'' in Fig. 4, and the duplicate bearing thus formed may well be disposed between the two pumper pedals of a player piano, the two tongues of this bracket yieldingly supporting pins at the adjacent sides of said pedals, while the pins at their outer sides may be adjustable as described above. In order to simplify and cheapen the construction of parts and at the same time reduce the possibility of rattling, we have shown the rod or shaft 1 and arm A as made in one piece in Fig. 1, and in Fig 3 we have shown the rod or shaft 1' and arm A' and pedal P' as all in one piece. In the former instance the adjustable bearing engages a socket actually in the extremity of the shaft while the yielding bearing engages a socket in the side of the arms A and here shown as placed a little to the rear of the angle 2 although practically in line with and opposite the end of the shaft; in Fig. 3 both the bearings are carried beyond the angles 2' and 2'' which are here acute, and the pins enter sockets in the sides of the arm A' and pedal P', and yet the pins are practically in line with and opposite the ends of the shaft.

In either case the bearings are of course at the extremities of the axis on which the pedal mechanism rocks; and, while we do not wish to be limited to the style of bearing itself, we prefer to dispose it at the extremities of the axis rather than have it embrace or surround a rock shaft or rocking member in which it may and quite possibly will soon result that looseness occurs, with its consequent rattle. This is avoided by end bearings, either adjustably or yieldably mounted, and when the looseness occurs it can be taken up. We have also made use of Fig. 3 to illustrate how both bearings might be yielding and perhaps of the type shown in Fig. 5, but it has been made plain above that sufficient resiliency will probably be present if one bearing only is yielding, although by preference we have the other bearing adjustable. We have made use of Fig. 3 also to show how a bearing might be rendered adjustable by means of set screws in the base engaging the slots 10 in the bracket B'.

While this invention is applicable especially to pedals for musical instruments, we do not wish to be limited strictly to such use of it. It is conceivable that conditions may occur where a yielding bearing of strap metal is not desirable, where it is not expedient to adjust the yielding bearing, or where the tension of the spring that is employed must be itself adjusted on occasions. Figs. 6 and 7 are illustrative of other forms of yielding bearings which may be employed. In Fig. 6 the end of the shaft 1 as shown in Fig. 1 is provided with a cavity 20 into which is passed a coiled spring 21, and then into the outer end of the cavity is inserted a pin 22 having a flat inner end 23 which bears against the spring and having its outer end conical as at 26 to enter a socket in a bearing which it is not necessary to illustrate in this connection; but the pin could have the socket and the bracket the cone without departing from our invention. In Fig. 7 we have shown the pin as mounted in the bracket B instead of in the shaft 1. This pin 32 has a conical point 36, its body being mounted in a cavity 30 in the upright portion of the bracket and preferably headed at its rear end as at 33 where the cavity is enlarged and threaded as at 39. Behind the head 33 in the enlarged portion of the cavity stands a coiled spring 31, and into the threaded portion of the cavity is passed a screw 34 whose nicked end or head 35 is exposed beyond the bracket B so that it may be reached with a suitable tool. It is quite obvious that the adjustment of the screw puts more or less tension onto the spring 31, and that expansion of the latter presses the pin 32 forward although its head 33 prevents its point 36 from being projected too far forward and prevents the pin from being lost out of the bracket. On the contrary, the pin 22 shown in Fig. 6 is held in the cavity 20 only when the shaft is in position between its bearings.

The simplification of the rocking element by bending a rod at the point 2 and continuing it to the rear into the arm A, or in some cases by bending the rod into both the arm and the pedal, reduces the cost of manufacture, simplifies the structure so that it may be more readily applied, places the bearings far apart so as to steady the structure when in action, is smaller and neater when in use, and positively eliminates the chance of rattling which always exists where separate members are connected with each other. As providing a rocking support on a line strictly at right angles to the length of the arm and pedal, we make the angles 2, 2' and 2'' a little sharper than right angles, as best seen in Fig. 3, and drill the sockets in the arm and pedal (or mount therein the pins if the arrangement is reversed) at points substantially at the ends of the shaft 1' but a little beyond the angles or bends and in direct alinement with each other.

What is claimed is:

1. In a pedal mechanism, the combination with a rocking element consisting of a shaft having a member projecting from one end in one direction and a second member projecting from its other end in the opposite direction, said element having sockets substantially opposite the ends of the shaft; of cone bearings engaging said sockets, brackets supporting said bearings and holding them yieldably in such engagement, and manual means for adjusting the relative position of said bearings.

2. In a pedal mechanism, the combination with transversely spaced cone bearings, and means for permitting the automatic adjustment of one of them and the manual adjustment of the other; of a rock shaft having sockets at its ends journaled on said bearings, an integral member projecting laterally from one end of the rod in one direction, and a second member rigidly connected with the rod near its other end and projecting laterally therefrom in the opposite direction.

3. In a pedal mechanism, the combination with a rod bent twice at substantially right angles into an intermediate rock shaft, an arm projecting integrally from one end thereof in one direction, and a pedal projecting integrally from the other end thereof in the other direction; of bearings opposite the ends of said shaft engaging the outer sides of the arm and pedal adjacent said angles in a line at right angles to said arm and pedal.

4. In a pedal mechanism, the combination with a rod bent twice at less than right angles into an intermediate shaft, an arm projecting integrally from one end thereof in one direction, and a pedal projecting integrally from the other end thereof in the other direction; of a subjacent base, brackets rising therefrom, and bearings carried by the brackets and having pointed inner ends, said arm and pedal having sockets in their outer sides beyond said angles and with which said ends engage.

5. In a pedal mechanism, the combination with a rod bent twice at less than right angles into an intermediate shaft, an arm projecting integrally from one end thereof in one direction, and a pedal projecting integrally from the other end thereof in the other direction, said arm and pedal having sockets in their outer sides beyond said angles; of a subjacent base, brackets rising therefrom, bearings carried by the brackets and having pointed inner ends entering said sockets, and means for adjusting the position of the bearings with respect to each other.

6. In a pedal mechanism, the combination with a rock shaft having an arm projecting in one direction and a pedal projecting in the other direction therefrom, and two bearings for such shaft each consisting of one element at the end thereof and another element coacting with the first; of means for supporting one of the last-named elements, and a bracket for supporting the other of the last-named elements, said bracket consisting of a foot underlying the shaft, an upright rising from the outer end of the foot to a point above the shaft, and a tongue depending from the upper end of the upright part way to the foot and supporting said element, the upright and tongue being adapted to yield on different arcs so as to compensate each other as described.

7. In a pedal mechanism, the combination with a rock shaft having an arm projecting in one direction and a pedal projecting in the other direction therefrom, and two bearings for such shaft each consisting of one element in the shaft at the end thereof and another element coacting with the first; of yielding supports for both said last-named elements, each support comprising a bracket secured to a base and having an upright rising therefrom and a tongue depending from the upper end of the upright and carrying said element, the upright and tongue compensating each other by yielding on different arcs, as set forth.

In testimony whereof we affix our signatures in presence of two witnesses.

ALBERT F. NORRIS.
CLIFTON H. NORRIS.

Witnesses:
GEO. O. WENTWORTH,
JENNIE F. MCNAMARA.

Copies of this patent may be obtained for five cents each, by addressing the "Commissioner of Patents, Washington, D. C."